UNITED STATES PATENT OFFICE.

ZACHARIE ROUSSIN AND DANIEL AUGUSTE ROSENSTIEHL, OF PARIS FRANCE, ASSIGNORS TO SOCIÉTÉ ANONYME DES MATIÉRÉS COLORANTES ET PRODUITS CHIMIQUES DE ST. DENIS, OF SAME PLACE.

MANUFACTURE OF BROMATED AZO COLORING-MATTERS.

SPECIFICATION forming part of Letters Patent No. 309,882, dated December 30, 1884.

Application filed February 1, 1883. (Specimens.) Patented in France November 29, 1882, No. 140,114, and in England November 30, 1882, No. 5,696.

*To all whom it may concern:*

Be it known that we, ZACHARIE ROUSSIN and DANIEL AUGUSTE ROSENSTIEHL, both of Paris, in the Republic of France, have invented certain new and useful Improvements in Coloring-Matters, of which the following specification is a full description.

This invention relates to the production of brominized or bromated azoic coloring-matters; and it consists in introducing the bromine directly into the coloring-matter after the latter has been formed. The coloring-matters which we have obtained by direct bromination of azoic coloring-matters are soluble in cold water, and adapted to the dyeing of mordanted cotton, and in color vary from clear yellow to orange.

Bromine acts rapidly upon the azoic coloring-matters and forms products which do not always differ in color from the generating coloring substances. Sometimes, however, modifications of the shade are produced, the product of the reaction becoming a little more reddish or greenish than the original color. The direct addition of bromine, although it produces slight changes in the color, imparts to the coloring-matters a greater aptitude to unite with textile fabrics, and this quality gives to them a true industrial value, it being found that the directly bromated azoic coloring-matters will much more readily fix themselves upon the vegetable fiber than substances not bromated.

As an example of the operation we shall describe the transformation of the coloring-matter called "orange I," (produced by the reaction of alpha naphthol on diazophenylsulphurous acid.) One hundred kilograms of orange I are dissolved in six thousand five hundred liters of water. Sixty kilograms of bromine dissolved in five hundred liters of alkaline water are added, and the liquid acidified with one hundred and thirty kilograms of sulphuric acid. When the reaction is complete, neutralization is effected by means of a suitable base, and the coloring-matter is precipitated in the ordinary manner by means of common salt.

The process just described may be applied with but little modification to other known azoic coloring-matters which will give analogous results. We do not limit ourselves to the proportions indicated, nor to the method described of causing the bromine to react.

Among the brominized azoic coloring-matters other than orange I, which may be produced by direct bromination, may be mentioned those from the reaction of naphthol alpha or naphthol beta upon diazo, paradiazo, or metadiazo phenysulphonic acid, also those from the reaction of dimethylaniline or diphenylamine upon the same acid; also those from reactions of the same substances (naphthol alpha or beta dimethylaniline or diphenylamine) upon diazocresylsulphonic acid, or the corresponding acid of otho and para toluidine.

We claim—

1. The process of producing brominized azoic coloring-matters by introducing the bromine directly into the coloring-matter after the latter has been formed, substantially as described.

2. The yellow and orange brominized azoic coloring-matters, of which brominized orange I is an example, the same being soluble in water, produced by direct bromination, and adapted to the dyeing of mordanted cotton, substantially as described.

In witness whereof we have hereunto signed our names in the presence of two subscribing witnesses.

ZACHARIE ROUSSIN.
DANIEL AUGUSTE ROSENSTIEHL.

Witnesses:
ROBT. M. HOOPER,
DAVID T. S. FULLER.